United States Patent
Zhu et al.

(10) Patent No.: US 11,402,143 B2
(45) Date of Patent: Aug. 2, 2022

(54) BLAST PIPE CONNECTOR AND AIR-COOLED REFRIGERATOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Guoliang Zhu, Anhui (CN); Zhenhai Ren, Anhui (CN); Jun Yao, Anhui (CN); Mingbo Jiang, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 267 days.

(21) Appl. No.: 16/610,843

(22) PCT Filed: May 3, 2018

(86) PCT No.: PCT/CN2018/085508
§ 371 (c)(1),
(2) Date: Apr. 13, 2020

(87) PCT Pub. No.: WO2018/202100
PCT Pub. Date: Nov. 8, 2018

(65) Prior Publication Data
US 2020/0248949 A1 Aug. 6, 2020

(30) Foreign Application Priority Data
May 4, 2017 (CN) .......................... 201710308808.X

(51) Int. Cl.
*F25D 17/06* (2006.01)
*F16L 37/26* (2006.01)

(52) U.S. Cl.
CPC .............. *F25D 17/06* (2013.01); *F16L 37/26* (2013.01); *F25D 2317/067* (2013.01)

(58) Field of Classification Search
CPC .......... F25D 17/06; F25D 17/08; F25D 17/04; F25D 2317/067; F16L 37/26
(Continued)

(56) References Cited

U.S. PATENT DOCUMENTS 6,195,910 B1 * 3/2001 Robineau ................ F26B 21/00
34/417
6,745,586 B1 * 6/2004 Reimann ............ B60H 1/00542
62/244
(Continued)

FOREIGN PATENT DOCUMENTS

CN 102927744 A 2/2013
CN 202885417 U 4/2013
(Continued)

*Primary Examiner* — Ana M Vazquez
(74) *Attorney, Agent, or Firm* — Seed IP Law Group LLP

(57) ABSTRACT

An air duct connector and an air-cooled refrigerator are provided. The air duct connector includes a first connector, a first guiding structure, a positioning structure, and a second connector. An accommodation space is formed in the first connector, and is provided with an insertion opening. The first connector is further provided with a first air opening. The first guiding structure and the positioning structure are disposed on the wall of the accommodation space. The second connector is provided with a second air opening and a second guiding structure, and is adapted to be inserted, from the insertion opening, into the accommodation space of the first connector. The first guiding structure guides the second guiding structure until the second guiding structure slides to and engages with the positioning structure, such that the second connector is positioned in the accommodation space and the first air opening is connected to the second air opening.

12 Claims, 3 Drawing Sheets

(58) Field of Classification Search
USPC .......................................................... 62/404
See application file for complete search history.

(56) References Cited

U.S. PATENT DOCUMENTS

2014/0073232 A1* 3/2014 Karas ..................... F16L 9/003
                                                    454/143
2016/0355970 A1* 12/2016 Federico ................ F16L 37/26

FOREIGN PATENT DOCUMENTS

| | | |
|---|---|---|
| CN | 103225939 A | 7/2013 |
| CN | 203605583 U | 5/2014 |
| CN | 203657322 U | 6/2014 |
| CN | 203893537 U | 10/2014 |
| CN | 104930262 A | 9/2015 |
| CN | 107202464 A | 9/2017 |
| EP | 2829829 A2 | 1/2015 |
| JP | 58-179481 U | 12/1983 |
| JP | 10-170136 A | 6/1998 |
| JP | 2001059674 A | 3/2001 |
| JP | 2002-257456 A | 9/2002 |

* cited by examiner

A-A

B-B

BLAST PIPE CONNECTOR AND AIR-COOLED REFRIGERATOR

FIELD

The present disclosure relates to a technology field of a refrigerating device, particularly to an air duct connector and an air-cooled refrigerator.

BACKGROUND

In conventional air-cooled refrigerators, it is necessary to provide an air-supply duct to supply air, and the air supply duct generally adopts a plastic component and is mostly embedded in the foam layer.

Generally, the air-supply duct may be divided into multiple sections in the air supply path. Taking the two-section type as an example, at the junction of the two-section type duct, an air duct connector is usually required to realize seal connection, but the conventional air duct connector has a complicated structure and is inconvenient to assemble.

SUMMARY

The present disclosure aims to solve at least one of the above technical problems in the related art to at least some extent. To this end, the present disclosure provides an air duct connector which is simple in structure and convenient for connection.

The present disclosure further provides an air-cooled refrigerator having the above-mentioned air duct connector.

The air duct connector according to embodiments of the present disclosure includes:

a first connector, an insertion space being defined in the first connector and having an insertion opening, the first connector being further provided with a first air opening;

a first guiding structure provided in a wall of the insertion space;

a positioning structure provided in the wall of the insertion space;

a second connector provided with a second air opening and a second guiding structure, the second connector being configured to be inserted into the insertion space through the insertion opening; wherein the first guiding structure guides the second guiding structure during the insertion until the second guiding structure slides to and engages with the positioning structure, such that the second connector is positioned in the insertion space and the first air opening is connected to the second air opening.

The air duct connector according to embodiments of the present disclosure has simple structure and is convenient to connect, and can facilitate the connection between the modular refrigeration system and the air duct of the cabinet.

In addition, the air duct connector according to embodiments of the present disclosure may further have the following additional technical features.

According to some embodiments of the present disclosure, the first connector comprises a first connector body, the first connector body comprises a bottom wall and a peripheral wall disposed to the bottom wall and formed into a U shape, the peripheral wall comprises a first side wall, a second side wall opposite to the first side wall, and a connecting wall between the first side wall and the second side wall, the insertion space is defined by the peripheral wall and the bottom wall, and an opening end of the U-shaped peripheral wall is configured as the insertion opening.

According to some embodiments of the present disclosure, the first guiding structure is oppositely disposed to opposite inner side surfaces of the first side wall and the second side wall separately, and the positioning structure is oppositely disposed to opposite inner side surfaces of the first side wall and the second side wall separately.

According to some embodiments of the present disclosure, the first guiding structure is a guide rail, and the second guiding structure is a guide post slidable on the guide rail.

According to some embodiments of the present disclosure, the positioning structure is integrated into the guide rail.

According to some embodiments of the present disclosure, the positioning structure is a stop protrusion formed in the guide rail.

According to some embodiments of the present disclosure, the guide rail comprises an inlet segment, a first straight segment, and a second straight segment sequentially connected, the inlet segment is adjacent to the insertion opening, and the first straight segment is located above the second straight segment such that the stop protrusion is formed at a transition region of the first straight segment and the second straight segment.

According to some embodiments of the present disclosure, the stop protrusion is abutted against the guide post so that the second connector is abutted against and cooperates with the bottom wall and the connecting wall separately and the guide post at two side surfaces of the second connectors is clamped and positioned between the first side wall and the second side wall.

According to some embodiments of the present disclosure, the air duct connector further includes a seal ring clamped and fixed between the first air opening and the second air opening and configured to seal a connection region of the first air opening and the second air opening.

According to some embodiments of the present disclosure, the seal ring is adhered and fixed to the bottom wall.

According to some embodiments of the present disclosure, a plurality of guide rails is provided in the first side wall and the second side wall and in one-to-one correspondence, and the guide post at two side surfaces of the first connector is in one-to-one correspondence to the guide rail at the same side.

The air-cooled refrigerator according to another aspect of the present disclosure includes the air duct connector described above.

The air-cooled refrigerator according to another aspect of the present disclosure includes:

a body provided with a compartment and an air channel configured to supply air into the compartment;

an external refrigeration system comprising a compressor, a condenser, and an evaporator, the external refrigeration system being located outside the body;

wherein the air duct connector is configured to connect the external refrigeration system and the air channel.

In the air-cooled refrigerator according to another aspect of the present disclosure, a concave portion is provided in the outer surface of the body, the air duct connector is accommodated in the concave portion, and the concave portion is open and closed by a movable door.

Figure 1:
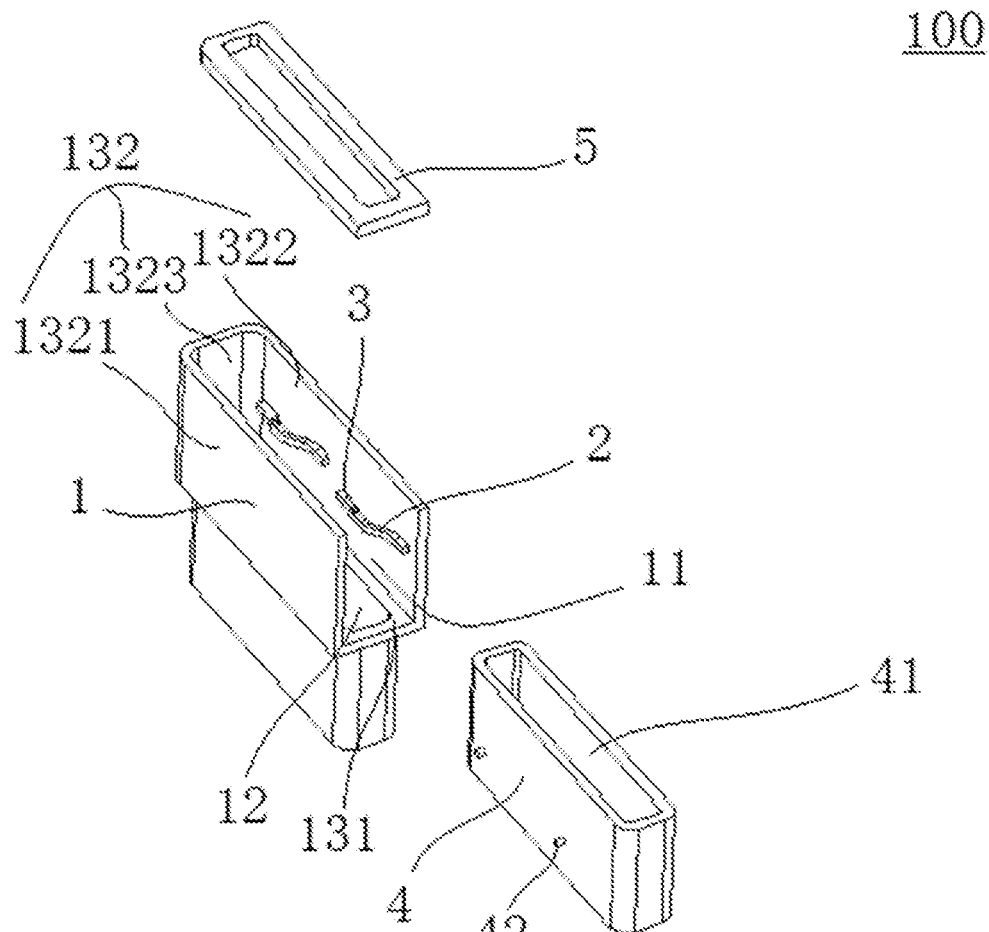
FIG. 1 is an exploded view illustrating an air duct connector according to the present disclosure.

REFERENCE NUMERALS air duct connector 100; first connector 1; insertion space 11; insertion opening 111; first air opening 12; first guiding structure 2; positioning structure 3; second connector 4; second air opening 41; second guiding structure 42; first connector body 13; bottom wall 131; peripheral wall 132; first side wall 1321; second side wall 1322; connecting wall 1323; inlet segment 21; first straight segment 22; second straight segment 23; seal ring 5.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

In the specification, unless specified or limited otherwise, relative terms such as "central", "longitudinal", "lateral", "length", "width", "thickness", "up", "down", "front", "rear", "right", "left", "vertical", "horizontal", "top", "bottom", "inner", "outer", "clockwise", "counter-clockwise" as well as derivative thereof should be construed to refer to the orientation as then described or as shown in the drawings under discussion. These relative terms are for convenience of description and do not require that the present disclosure be constructed or operated in a particular orientation, thus cannot be construed to limit the present disclosure.

Moreover, the terms "first" and "second" are used for descriptive purposes only and are not to be construed as indicating or implying relative importance or implicitly indicating the number of technical features indicated. Thus, features defined by "first" and "second" may include one or more of the features either explicitly or implicitly. In the description of the present disclosure, the meaning of "a plurality of" is at least two, such as two, three, etc., unless specifically defined otherwise.

In the present disclosure, unless specified or limited otherwise, it should be noted that, terms "mounted," "connected," "fixed" and "coupled" may be understood broadly, such as permanent connection or detachable connection, or integration; mechanical connection, electronic connection or connection with communication therebetween; direct connection or indirect connection via intermediary, inner communication or interaction between two elements. These having ordinary skills in the art should understand the specific meanings in the present disclosure according to specific situations.

In the present disclosure, unless specifically defined and limited otherwise, the first feature is "on" or "under" the second feature may include the case that the first and second features are in direct contact, and may also include the case that the first and second features are not in direct contact but in contact through additional features between them. Moreover, the first feature is "above", "on" and "on top of" the second feature includes the case that the first feature is directly above and obliquely above the second feature, or merely indicates that the first feature is higher than the second feature at horizontal level. The first feature is "below", "under" and "beneath of" the second feature includes the case that the first feature is directly below and obliquely below the second feature, or merely indicates that the first feature is lower than the second feature at horizontal level.

An air duct connector 100 according to embodiments of the present disclosure is described below with reference to FIG. 1 to FIG. 8.

The air duct connector 100 according to embodiments of the present disclosure may include a first connector 1, a first guiding structure 2, a positioning structure 3, and a second connector 4. 100 can be configured to connect two air ducts, for example, the first connector 1 is connected to one of the two air ducts, and the second connector 4 is connected to the other of the two air ducts, and the first connector 1 and the second connector 4 are fitted in an insertion manner.

Figure 3:
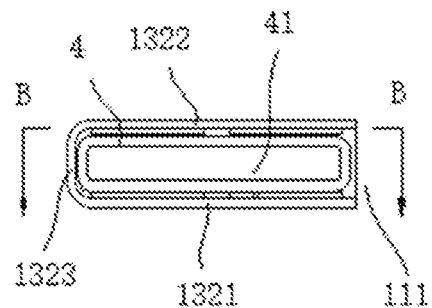
FIG. 3 is a top plan view illustrating an air duct connector according to the present disclosure in a locked state.
Figure 4:
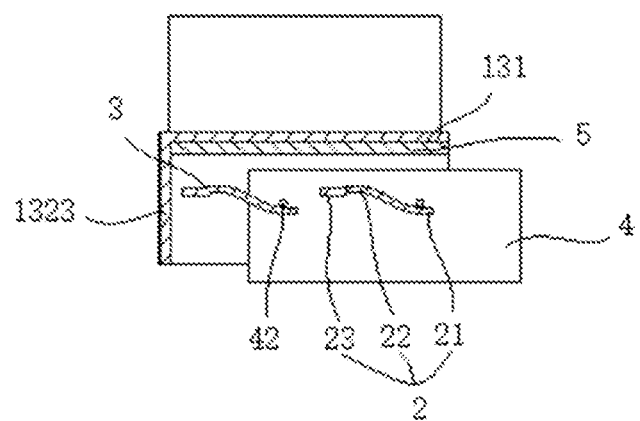
FIG. 4 is a sectional view along line A-A in FIG. 2.

As illustrated in FIG. 1, FIG. 3, and FIG. 4, an insertion space 11 is defined in the first connector 1 and has an insertion opening 111, and the first connector 1 is further provided with a first air opening 12. The insertion opening 111 and the insertion space 11 is configured such that the second connector 4 can be conveniently inserted and fixed in the first connector 1.

The first guiding structure 2 is disposed in a wall of the insertion space 11, and the positioning structure 3 is disposed to a wall of the insertion space 11. Therefore, space is further saved and structure is more compact.

Figure 5:
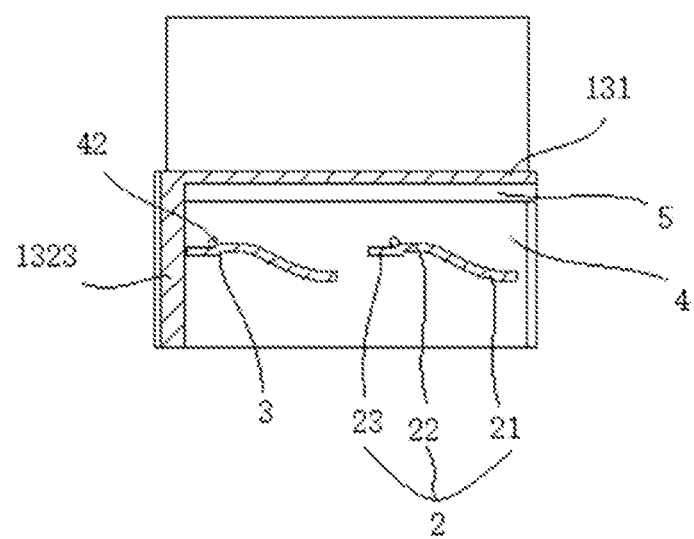
FIG. 5 is a sectional view along line B-B in FIG. 3.
Figure 8:
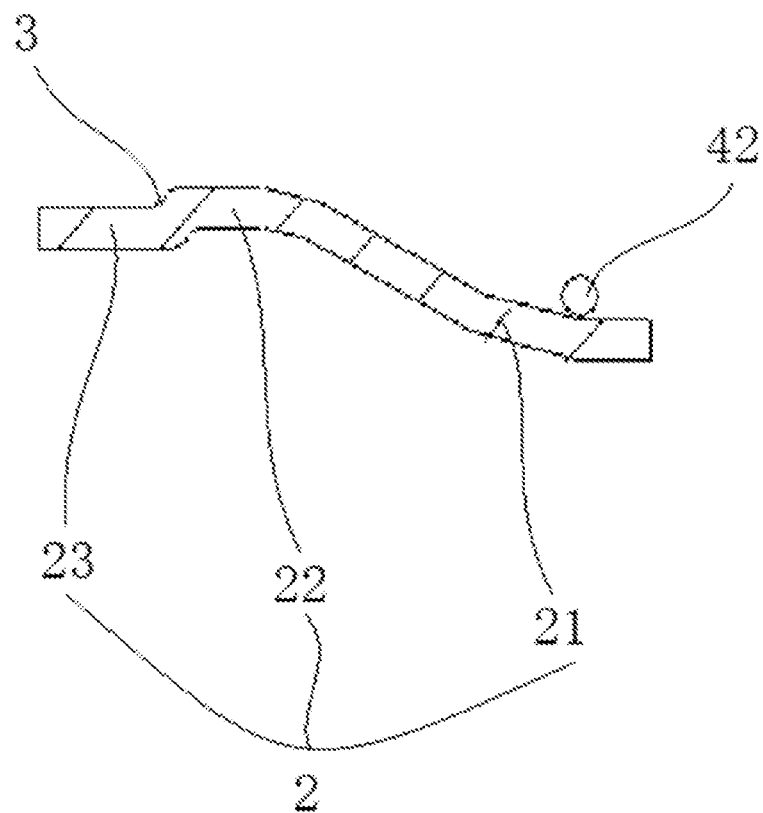
FIG. 8 is a structural schematic view of a first guiding structure and a second guiding structure of an air duct connector according to the present disclosure.

Referring to FIGS. 4, 5 and 8, the second connector 4 is provided with a second air opening 41 and a second guiding structure 42. The second connector 4 is configured to be inserted into the insertion space 11 through the insertion opening 111. The first guiding structure 2 guides the second guiding structure 42 during the insertion until the second guiding structure 42 slides to and engages with the positioning structure 3, such that the second connector 4 is positioned in the insertion space 11 and the first air opening 12 is connected to the second air opening 41.

For example, referring to the embodiments illustrated in FIGS. 4 and 5, the second connector 4 can pass through the insertion opening 111 at right side and partially enter the insertion space 11, in this case, the second guiding structure 42 can be located at an inlet segment 21. Afterwards, the second connector 4 is pushed towards the insertion space 11 (for example, leftwards), the first guiding structure 2 guides the second guiding structure 42 until the second guiding structure 42 slides to the positioning structure 3 and is fitted with and positioned by the positioning structure 3. In this case, the second connector 4 is fully connected to the first connector 1, the first air opening 12 is connected to the second air opening 41. The air openings are connected so that two ducts connected by the air duct connectors are communicated with each other.

The air duct connector 100 according to embodiments of the present disclosure has simple and convenient structures, is easy to operate, which eliminates the disadvantages of conventional refrigerators where the integrated foaming is sealed by adhesive tape.

Figure 2:
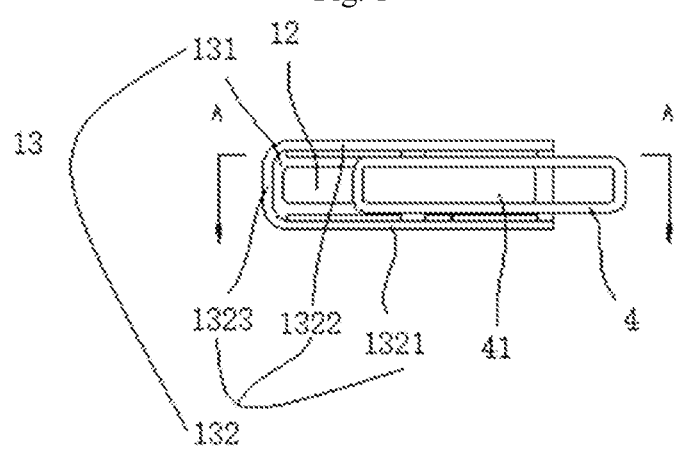
FIG. 2 is a top plan view illustrating an air duct connector according to the present disclosure in an unlocked state.

Referring to FIGS. 1, 2 and 3, the first connector 1 includes a first connector body 13, the first connector body 13 includes a bottom wall 131 and a peripheral wall 132 disposed to the bottom wall 131 and formed into a U shape.

The peripheral wall 132 includes a first side wall 1321, a second side wall 1322 opposite to the first side wall 1321, and a connecting wall 1323 between the first side wall 1321 and the second side wall 1322, the insertion space 11 is defined by the peripheral wall 132 and the bottom wall 131, and an opening end of the U-shaped peripheral wall 132 is configured as the insertion opening 111.

The U-shaped insertion space 11 is formed by the bottom wall 131 and the peripheral wall 132, which preferably has the same shape as the second connector 4, so as to facilitate the insertion and fixation of the second connector 4 into the insertion space 11, and make the structure of the air duct connector 100 more compact.

In combination of the embodiments illustrated in FIGS. 1, 4 and 5, the first guiding structure 2 is oppositely disposed to opposite inner side surfaces of the first side wall 1321 and the second side wall 1322, and the positioning structure 3 is oppositely disposed to opposite inner side surfaces of the first side wall 1321 and the second side wall 1322. Therefore, the space is saved and the structure is more compact.

Specifically, the first guiding structure 2 is a guide rail, and the second guiding structure 42 is a guide post slidable on the guide rail. The cooperation of the guide rail and the guide post makes the guiding effect better.

Referring to FIG. 8, the positioning structure 3 is integrated into the guide rail. In this way, the space is further saved, the structure is made more compact, and it is more convenient for the guide post to slide to and be fitted with the positioning structure 3.

Specifically, the positioning structure 3 is a stop protrusion formed in the guide rail. Thus, the material is saved, the stop protrusion is directly formed in the guide rail, and it is needless to add other components.

The guide rail includes an inlet segment 21, a first straight segment 22, and a second straight segment 23 sequentially connected, the inlet segment 21 is adjacent to the insertion opening 111, and the first straight segment 22 is located above the second straight segment 23 such that the stop protrusion is formed at a transition region of the first straight segment 22 and the second straight segment 23. The stop protrusion 3 is disposed to the guide rail, so that the space is further saved, and with the first straight segment 22 being located above the second straight segment 23 such that the stop protrusion is formed at the transition region of the first straight segment 22 and the second straight segment 23, the structure is simple and the operation is convenient.

Figure 6:
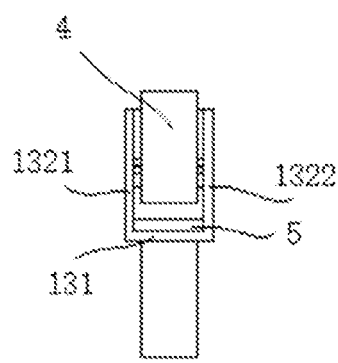
FIG. 6 is a side view illustrating an air duct connector according to the present disclosure in a unlocked state.
Figure 7:
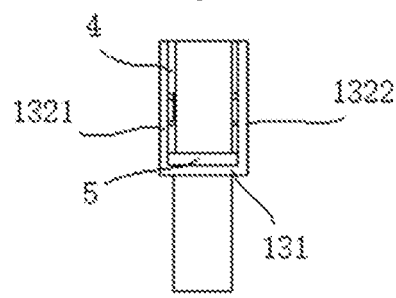
FIG. 7 is a side view illustrating an air duct connector according to the present disclosure in a locked state.

In combination of the embodiments illustrated in FIGS. 5, 6 and 7, the stop protrusion 3 is abutted against the guide post 42 so that the second connector 4 is abutted against and cooperates with the bottom wall 131 and the connecting wall 1323 separately and the guide post 42 at two side surfaces of the second connectors 4 is clamped and positioned between the first side wall 1321 and the second side wall 1322.

When the second guiding structure 42 slides to and cooperates with the positioning structure 3, the second connector 4 is separately abutted against and fitted with the bottom wall 131 and the connecting wall 1323, and the guide posts at two side surfaces of the second connector 4 is clamped and positioned between the first side wall 1321 and the second side wall 1322, so that the limitation of the freedom in X, Y and Z directions are realized, hence guaranteeing the corresponding positions of the first connector 1 and the second connector 4, and the second connector 4 cannot move back and forth, left and right, and up and down in the insertion space 11, so that the air duct connector 100 can be fixed more firmly.

According to some embodiments of the present disclosure, a seal ring 5 clamped and fixed between the first air opening 12 and the second air opening 41 and configured to seal a connection region of the first air opening 12 and the second air opening 41 is further included. The seal ring is configured so that the seal property between the first air opening 12 and the second air opening 41 is better, and the air leakage is prevented.

Further, the seal ring 5 is adhered to and fixed to the bottom wall 131. Thus, when the first connector 1 and the second connector 4 are fully fixedly connected, the seal 5 is clamped at the connection region of the first air opening 12 and the second air opening 41, so that the seal effect is better.

A plurality of guide rails is provided in the first side wall 1321 and the second side wall 1322 and in one-to-one correspondence, and the guide post at two side surfaces of the first connector 1 is in one-to-one correspondence to the guide rail at the same side. Therefore, the process of insertion and fixation is simpler and easy to operate, and the second connector 4 is stressed evenly, and the fixation effect is better.

An air-cooled refrigerator according to embodiments of another aspect of the present disclosure includes the air duct connector 100 described in the above-mentioned embodiments. Other configurations for the air-cooled refrigerator, such as compressors, etc., are well known in the art and are well known to those skilled in the art, and thus other configurations of the air-cooled refrigerator are not described in detail herein.

In some embodiments, the air-cooled refrigerator includes a body and an external refrigeration system. The body is provided with a compartment and an air channel configured to supply air into the compartment. The external refrigeration system includes a compressor, a condenser, and an evaporator, and the external refrigeration system is located outside the body. The air duct connector 100 is configured to connect the external refrigeration system and the air channel.

Separating the refrigeration system from the refrigerator body can make the space utilization of the refrigerator larger, the refrigeration system does not occupy the space of the refrigerator body and can be placed outdoors and the like, and it is possible to realize correspondence of an external refrigeration system and a plurality of refrigerator bodies, so that the refrigerator has better using effect.

In the air-cooled refrigerator according to another aspect of the present disclosure, a concave portion is provided in the outer surface of the body, the air duct connector 100 is accommodated in the concave portion, and the concave portion is open and closed by a movable door.

When the external refrigeration system is required to refrigerate, the movable door is opened to take out the air duct connector 100 from the concave portion to be connected for refrigeration. When the refrigeration is completed, the air duct connector 100 can be accommodated in the concave portion, and the movable door is closed, which is simple in operation and saves space.

In the description of the present specification, the description with reference to the terms "one embodiment", "some embodiments", "example", "specific example", or "some examples" and the like means a specific feature, structure, material or characteristic described in connection with the embodiment or example is included in at least one embodiment or example of the disclosure. In the present specification, the schematic representation of the above terms is not necessarily directed to the same embodiment or example.

Furthermore, the particular features, structures, materials, or characteristics described may be combined in a suitable manner in any one or more embodiments or examples. Further, various embodiments or examples described in this specification can be joined and combined by those skilled in the art.

Although the embodiments of the present disclosure have been shown and described, it is understood that the above-described embodiments are illustrative and are not to be construed as limiting the scope of the invention. Variations, modifications, alterations and variations of the above-described embodiments may be made by those skilled in the art within the scope of the disclosure.

What is claimed is:

1. An air duct connector, comprising:
a first connector having an insertion space and a first air opening, the insertion space having an insertion opening in a first direction, a first guiding structure on a wall of the insertion space extended in the first direction, and a positioning structure on the wall of the insertion space extended in the first direction;
a second connector having a second air opening and a second guiding structure, the second connector slidably inserted into the insertion space through the insertion opening in the first direction, the second guiding structure protruded towards a second direction transverse to the first direction;
wherein the first guiding structure is structured to guide the second guiding structure of the second connector into the insertion space until the second guiding structure slides to and engages with the positioning structure and the first air opening abuts the second air opening,
wherein the second guiding structure is substantially smaller than the first guiding structure,
wherein:
the first connector comprises a first connector body, the first connector body comprises a bottom wall and a peripheral wall coupled to the bottom wall, the peripheral wall being U-shaped,
the peripheral wall comprises a first side wall, a second side wall opposite to the first side wall, and a connecting wall between the first side wall and the second side wall, the insertion space being defined by the peripheral wall and the bottom wall, and
an opening end of the U-shaped peripheral wall is the insertion opening,
wherein the first guiding structure is disposed on inner side surfaces of the first side wall and the second side wall that oppose one another, and the positioning structure is disposed on the inner side surfaces of the first side wall and the second side wall,
wherein the first guiding structure is a guide rail, and the second guiding structure is a guide post slidable on the guide rail,
wherein:
the guide rail includes an inlet segment, a first straight segment, and a second straight segment coupled to one another,
the inlet segment is adjacent to the insertion opening, and the first straight segment is located above the second straight segment and the protrusion stop is positioned at a transition region between the first straight segment and the second straight segment.

2. The air duct connector according to claim 1, wherein the first guiding structure is disposed on inner side surfaces of the first side wall and the second side wall that oppose one another, and the positioning structure is disposed on the inner side surfaces of the first side wall and the second side wall.

3. The air duct connector according to claim 1, wherein the positioning structure is integrated into the guide rail.

4. The air duct connector according to claim 3, wherein the positioning structure is a protrusion stop in the guide rail.

5. The air duct connector according to claim 3, wherein:
a protrusion stop abuts against the guide post and the second connector abuts against and matches with the bottom wall and the connecting wall,
the guide post of the second connecter is positioned on two side surfaces of the second connector, and
the guide post is clamped and positioned between the first side wall and the second side wall of the peripheral wall of the first connector.

6. The air duct connector according to claim 1, further comprising a seal ring coupled, through clamping, between the first air opening and the second air opening and seals a connection region between the first air opening and the second air opening.

7. The air duct connector according to claim 6, wherein the seal ring is adhered and fixed to the bottom wall.

8. An air duct connector, comprising:
a first connector having an insertion space and a first air opening, the insertion space having an insertion opening in a first direction, a first guiding structure on a wall of the insertion space extended in the first direction, and a positioning structure on the wall of the insertion space extended in the first direction;
a second connector having a second air opening and a second guiding structure, the second connector slidably inserted into the insertion space through the insertion opening in the first direction, the second guiding structure protruded towards a second direction transverse to the first direction;
wherein the first guiding structure is structured to guide the second guiding structure of the second connector into the insertion space until the second guiding structure slides to and engages with the positioning structure and the first air opening abuts the second air opening,
wherein the second guiding structure is substantially smaller than the first guiding structure,
wherein:
the first connector comprises a first connector body, the first connector body comprises a bottom wall and a peripheral wall coupled to the bottom wall, the peripheral wall being U-shaped,
the peripheral wall comprises a first side wall, a second side wall opposite to the first side wall, and a connecting wall between the first side wall and the second side wall, the insertion space being defined by the peripheral wall and the bottom wall, and
an opening end of the U-shaped peripheral wall is the insertion opening,
wherein the first guiding structure is a guide rail, and the second guiding structure is a guide post slidable on the guide rail,
wherein the positioning structure is integrated into the guide rail,
wherein the positioning structure is a protrusion stop in the guide rail, and
wherein the first guiding structure includes a plurality of guide rails provided in the first side wall and the second side wall, a guide rail in the first side wall corresponding to a guide rail in the second side wall, and the second guiding structure includes a plurality of guide posts at two side surfaces of the first connector and in one-to-one correspondence to the plurality of guide rails.

9. An air-cooled refrigerator, comprising an air duct connector, the air duct connector including:
- a first connector having an insertion space and a first air opening, the insertion space having an insertion opening in a first direction, a first guiding structure on a wall of the insertion space extended in the first direction, and a positioning structure on the wall of the insertion space extended in the first direction;
- a second connector having a second air opening and a second guiding structure, the second connector slidably inserted into the insertion space through the insertion opening in the first direction, the second guiding structure protruded towards a second direction transverse to the first direction;
- wherein the first guiding structure is structured to guide the second guiding structure for the second connector into the insertion space until the second guiding structure slides to and engages with the positioning structure and the first air opening abuts the second air opening,
- wherein the second guiding structure is substantially smaller than the first guiding structure,
- wherein:
- the first connector comprises a first connector body, the first connector body comprises a bottom wall and a peripheral wall coupled to the bottom wall, the peripheral wall being U-shaped,
- the peripheral wall comprises a first side wall, a second side wall opposite to the first side wall, and a connecting wall between the first side wall and the second side wall, the insertion space being defined by the peripheral wall and the bottom wall, and
- an opening end of the U-shaped peripheral wall is the insertion opening,
- wherein the first guiding structure is a guide rail, and the second guiding structure is a guide post slidable on the guide rail,
- wherein:
- the guide rail includes an inlet segment, a first straight segment, and a second straight segment coupled to one another,
- the inlet segment is adjacent to the insertion opening, and
- the first straight segment is located above the second straight segment and the protrusion stop is positioned at a transition region between the first straight segment and the second straight segment.

10. The air duct connector according to claim 9, wherein the first guiding structure is disposed on inner side surfaces of the first side wall and the second side wall that are opposite to one another, and the positioning structure is disposed on the inner side surfaces of the first side wall and the second side wall.

11. The air duct connector according to claim 9, wherein the positioning structure is integrated into the guide rail.

12. The air duct connector according to claim 11, wherein the positioning structure is a protrusion stop in the guide rail.

* * * * *